United States Patent [19]

Kindler et al.

[11] Patent Number: 4,898,777

[45] Date of Patent: Feb. 6, 1990

[54] HIGH-STRENGTH FLUORIDE GLASS FIBERS AND PROCESS OF MAKING

[75] Inventors: Edwin A. Kindler, Takoma Park; Danh C. Tran, Bethesda, both of Md.

[73] Assignee: Infrared Fiber Systems, Silver Spring, Md.

[21] Appl. No.: 300,852

[22] Filed: Jan. 24, 1989

[51] Int. Cl.⁴ ............................................. C03C 15/00
[52] U.S. Cl. ...................................... 428/364; 65/3.14; 65/3.15; 65/31; 65/DIG. 16; 428/392; 156/663
[58] Field of Search ......... 65/3.14, 3.15, 31, DIG. 16; 428/392, 364; 156/663

[56] References Cited

U.S. PATENT DOCUMENTS

| | | | |
|---|---|---|---|
| 2,366,825 | 1/1945 | Adams | 65/31 X |
| 2,904,414 | 9/1959 | Ostrander et al. | 41/42 X |
| 3,975,175 | 8/1976 | Foster et al. | 65/31 |
| 4,102,706 | 7/1978 | Thomas | 65/31 X |
| 4,110,093 | 8/1978 | Macedo et al. | 65/3.15 |
| 4,165,222 | 8/1979 | de Panafieu et al. | 65/31 X |
| 4,295,869 | 10/1981 | Shiraishi et al. | 65/DIG. 16 |
| 4,319,905 | 3/1982 | Macedo et al. | 65/31 |
| 4,631,114 | 12/1986 | Schneider | 65/31 X |
| 4,670,033 | 2/1987 | Miura | 65/3.15 |

FOREIGN PATENT DOCUMENTS 0017939 2/1981 Japan ........................................ 65/31

*Primary Examiner*—Arthur Kellogg
*Attorney, Agent, or Firm*—Browdy & Neimark

[57] ABSTRACT

A novel solution of $H_3BO_3$ dissolved in strong hydrochloric or nitric acid is used to etch fluoride glass preforms used to manufacture fluoride glass fibers. Because of the excellent cleaning ability of the present solution, as well as the absence of sub-micron deposits, the resulting fibers have excellent bending strength.

12 Claims, 1 Drawing Sheet

SPECTRAL LOSS CURVE FOR A FLUORIDE GLASS FIBER

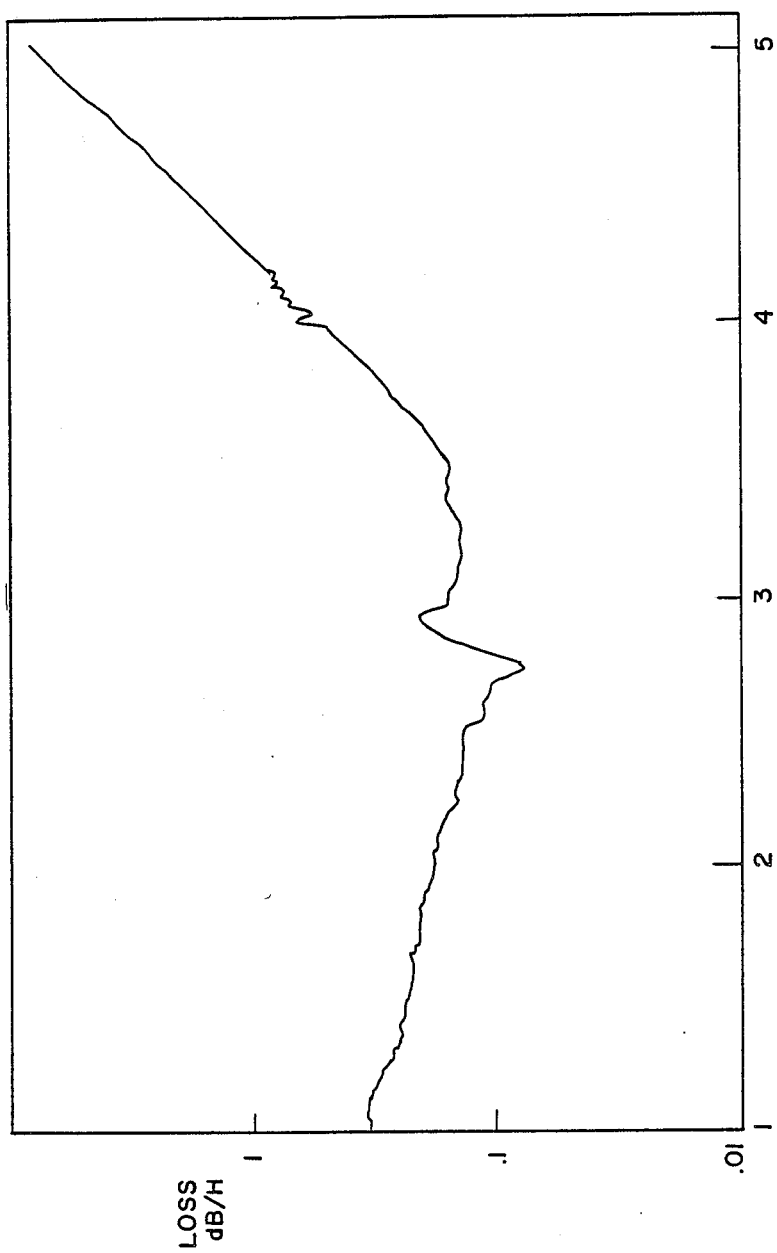

HIGH-STRENGTH FLUORIDE GLASS FIBERS AND PROCESS OF MAKING

BACKGROUND OF THE INVENTION a. Field of the Invention

The present invention relates to the production of fluoride glass fibers, and more particularly, to the etching of preforms therefor.

b. Description of the Prior Art

Recently, there has been a great demand for optical fibers which operate in the mid-infrared. Mid-infrared fiber applications include ultra-low loss data communication links, temperature sensors, remote spectroscopy and powder delivery. Optical fibers drawn from fluoride glasses are most suitable for these applications because of their high optical transparency in the 2 to 5 micron wavelength region, as illustrated in FIG. 1. A typical fluoride glass contains between 50-70% $ZrF_4$ which serves as the glass network modifier, and more additional fluorides such as $AlF_3$, $LaF_3$, NaF, LiF and $PbF_2$ which are considered to be the glass secondary network modifiers. The typical fluoride glass compositions are given in U.S. Pat. No. 4,4445, 755, U.S. Pat. No. 4,674,835 and U.S. Pat. No. 4,141,741. Optical fibers with low optical attenuation are drawn from fluoride glass rods prepared by casting fluoride melts into cylindrical metallic molds. These fibers are now commercially being produced.

A limitation concerning commercial fluoride glass fibers at the present time is that they are mechanically weak. The low tensile strength of these fibers arises from flaws and defects which are induced on the surface of the rod in contact with the metallic mold. Efforst in strengthening fluoride glass fibers include mechanical polishing and chemical etching to remove surface flaws. The best result was obtained by Schneider et al., to be published in SPIE Proceedings, Vol. 799, using $ZrOCl_2$ as an etching solution. Fluoride glass fibers drawn from glass rods etched with the $ZrOCl_2$ solution exhibit an average tensile strength of 400 MPa. At this strength level, the use of fluoride glass fibers are limited to applications which do not require a small fiber bending radius. This would exclude medical applications such as general laser surgery, angioplasty, or blood gas analysis whose fiber bending requirements are very stringent. Attempts to further increase the fiber strength using $ZrOCl_2$ have failed because of a consistent appearance of unknown submicroscopic defects deposited on the etched surface.

SUMMARY OF THE INVENTION

This invention relates to fluoride fiber strengthening by first etching away surface flaws on fluoride glass rods, which results in a pristine surface, free of submicroscopic deposits, then removing surface water contamination induced by etching, using a reactive atmosphere containing fluorine. The invention relies upon a novel etching solution of boric acid in hydrochloric or nitric acid.

BRIEF DESCRIPTION OF THE DRAWING

The sole drawing shows the spectral loss curve of typical fluoride glass fibers.

DETAILED DESCRIPTION OF THE INVENTION

The surface of fluoride glass specimens etched in $ZrOCl_2$ solution appears very smooth to the eye. But under an electron microscope, one can observe a fine submicron structure on the glass surface. The nature of the submicron particle deposit is unknown, but it does inhibit further improvement of the fiber strength beyond 400 MPa. It is well known in the fiber optics industry that flaws or particulate matter present on the surface of a glass rod will degrade the strength of the fiber drawn therefrom.

A novel solution, based on $H_3BO_3$ dissolved in strong, preferably about 1-11.5M, more preferably about 3-8M and most preferably 6M HCl, or preferably about 1-6M, more preferably about 5-10M and most preferably 8M $HNO_3$, is used for etching fluoride glass surface. The concentration of $H_3BO_3$ in a hydrohalic acid was chosen to around 0.1 to 1M, preferably about 0.3-0.6 and most preferably about 0.4, molar. On contact with the acid etching solution, fluoride components in the glass react to form borates which break down and dissolve the glass structure. After etching, the fluoride glass rod is rinsed with water or hydrochloric or nitric acid solution to remove traces of remaining $H_3BO_3$ in the etching solution, and is subsequently dried to remove water or nitric acid or hydrochloric acid from the glass surface. A volatile solvent, such as acetone, or volatile alcohols, such as methyl, ethyl and isopropyl alcohol, may be used for drying. The as etched glass surface is pristine and no submicron deposits can be observed using electron microscopy.

During the fiber drawing process at temperatures of about 345° C., trace water contaminatin must be eliminated. At elevated temperatures, water quickly reacts with the fluoride glass surface, forming hydroxides which induce surface crystallization followed by fiber strength degradation. It is suggested that a reactive gas atmosphere be used to remove water during fiber drawing. As disclosed in the U.S. patent application No. 07/133,723, incorporated herein by reference, reactive gases containing fluorine, chlorine or sulfide can be used. Fluoride fibers obtained from glass rods etched with an $H_3BO_3$ in $HNO_3$, HCl or other hydrohalic acid solution, followed by water removal with a reactive gas during the fiber drawing process, exhibit a substantially higher tensile strength than previously reported for fluoride glass fibers otherwise produced.

Preferably, immersion and etching are performed at between 10-100° C., and most preferably at room temperture. Higher temperatures increase the rate of etching and thus decrease control over the etching/cleaning process, permitting an overly large amount of the preform surface to be etched away and therefore wasted. Lower temperature decrease the reaction rate, and although they may increase control over the depth of etching, may make the process impractically slow.

EXAMPLES

The following examples are illustrative only and are not intended as limiting in any manner.

In the following examples, the molar compositions used for core and cladding fluoride glasses are as follows:

core=35 to 65$MF_4$; 15 to 25$BaF_2$; 2 to 5$LaF_3$; 10 to 25NaF; 1.0 to 20 Lif; 1 to 7$PbF_2$ clad = 35 to 65MF$_4$; 15 to 25BaF$_2$; 2 to 5LaF$_3$; 10 to 25NaF; 1.0 to 20 LiF, where M is Hf or Zr or a mixture thereof.

The fluoride glasses were melted using all fluoride starting chemicals in a glass box atmosphere of N$_2$ or Ar. Both platinum and vitreous carbon crucibles were used for melting. The melts were heated slowly to around 850° and refined for 45 min.

Example 1

30 g of glass cladding melt was cast at 625° C. into a cylindrical brass mold preheated at 285° C. The mold was rotatedto form a cladding tube, 11 mm OD, 6 mm ID and 120 mm long. Next, 20 g of glass core melt heated to 525° C. was poured into the tube to form a waveguide preform rod. The preform rod was annealed at 285° C. prior to its removal from the brass mold. The rod was immersed in a 0.4M H$_3$BO$_3$ in HCl solution for 15 min., then rinsed with deionized water and finally dried with acetone. The drawing of the rod was carried out using CF$_4$ as a reactive gas. The draw temperature was maintained at 350° C. and the draw speed was controlled at 9m/min. As the drawn fiber exited the fiber draw furnace, it was coated with a polymer resin to protect the fiber surface from scratching. The fiber length was 120m and the fiber diameter was 150 microns. 35 fiber samples were randomly chosen for strength testing using the bend test. An average fiber strength of 840 MPa was obtained. The minimum and maximum strength were 560 MPa and 1300 MPa, respectively. The standard deviation was 130 MPa and the variance was 15.6%. The equation used was Bend Strength = 1.198E(2r/D − d)

where

E = elastic modulus, 2r = uncoated fiber diameter,
D = faceplate separation at break and
d = overall fiber diameter.

The strain at failure was calculated by using the part of the above equation in parenthesis and multiplying it by 100%. The average strain at failure was 1.26% with a standard deviation of 0.20% and a variance of 15.6%. The minimum and maximum values of strain measured were 1.65% and 0.83% respectively.

Example 2

A fluoride glass rod preform 12mm in diameter and 120mm long was prepared as in Example 1. The glass rod was etched in a saturated H$_3$BO$_3$ in HNO$_3$ solution for 15 min., rinsed with HNO$_3$ and then dried with acetone. The rod was drawn using an NF$_3$ reactive gas atmosphere. The draw parameters were set as in Example 1. 95m of fluoride fibers, 150 microns in diameter were obtained. The minimum bending radius of the fiber at breakage was measured to be 3.0mm. This minimum fiber bending radius is acceptable for most medical laser surgery applications.

Of course these skilled in the art may make several modifications without departing from the present invention as reflected in the scope of the appended claims.

What is claimed is:

1. A method for etching the surface of a fluoride glass fiber preform, comprising the steps of:
   immersing a fluoride glass fiber preform in a solution of H$_3$BO$_3$ dissolved in hydrochloric or nitric acid until a desired degree of surface etching is obtained;
   removing said preform from said solution;
   rinsing said preform with water or hydrohalic or nitric acid; and
   drying said preform with a volatile solvent.

2. The method of claim 1, wherein the concentration of H$_3$BO$_3$ in said solution is about 0.1–1M 3. The method of claim 1, wherein the volatile solvent is an alcohol or acetone.

4. The method of claim 3, wherein said alcohol is methyl, ethyl or isopropyl alcohol.

5. The method of claim 1, wherein said solution is maintained at about 10–100° C. during said immersion.

6. The method of claim 1, wherein said solution is maintained at about room temperature during said immersion.

7. The method of claim 1, wherein said H$_3$BO$_3$ is dissolved in about 1–11.5 molar hydrochloric or 1–16M nitric acid.

8. The method of claim 1, wherein said preform is immersed for about 15 minutes to about 2 hours.

9. A method of producing a fluoride glass fiber having increased stength, comprising the steps of:
   immersing a fluoride glass preform in a solution of H$_3$BO$_3$ dissolved in hydrochloric or nitric acid until a desired degree of surface etching is obtained;
   removing said preform from said solution;
   rinsing said preform with water or hydrochloric or nitric acid;
   drying said preform with a volatile solvent; and then drawing said etched preform into a fiber.

10. The method of claim 9, wherein said preform is drawn in a reactive gas atmosphere to remove trace water contamination.

11. A fluoride glass fiber produced according to claim 9.

12. A fluoride glass fiber produced according to claim 10.

* * * * *